Aug. 9, 1927.

T. GENSMER ET AL 1,638,689

AUTOMATIC GEARLESS TRANSMISSION

Filed Dec. 24, 1924      5 Sheets-Sheet 1

Inventors:
Theodore Gensmer,
and Robert Z. Farmer,
By Attorney,
Horace Barnes

Aug. 9, 1927.

T. GENSMER ET AL 1,638,689

AUTOMATIC GEARLESS TRANSMISSION

Filed Dec. 24, 1924    5 Sheets-Sheet 2

Fig. 2

Inventors:
Theodore Gensmer
and Robert Z. Farmer,
By Attorney,
Horace Barnes.

Aug. 9, 1927.  
T. GENSMER ET AL  
1,638,689  
AUTOMATIC GEARLESS TRANSMISSION  
Filed Dec. 24, 1924  
5 Sheets-Sheet 4

Inventors:
Theodore Gensmer,
and Robert Z. Farmer
By Attorney,
Horace Barnes

Aug. 9, 1927.

T. GENSMER ET AL 1,638,689

AUTOMATIC GEARLESS TRANSMISSION

Filed Dec. 24, 1924     5 Sheets-Sheet 5

Inventors:
Theodore Gensmer,
and Robert Z. Farmer,
By Attorney,
Horace Barnes.

Patented Aug. 9, 1927.

1,638,689

UNITED STATES PATENT OFFICE.

THEODORE GENSMER AND ROBERT Z. FARMER, OF PORTLAND, OREGON, ASSIGNORS TO AUTOMATIC TRANSMISSION COMPANY, A CORPORATION OF OREGON.

AUTOMATIC GEARLESS TRANSMISSION.

Application filed December 24, 1924. Serial No. 757,784.

This invention relates to improvements in automatic variable speed transmission apparatus generally, and particularly to the adaptation of such devices to the power transmission of automobiles.

The object of our invention is the provision of simple and practicable apparatus to transmit the power of the motor of an automobile to the drive wheels with variable speeds and without the employment of gearing or other stepped variations in speed.

A further object of the invention is to provide apparatus of simple construction having definite high and low speeds as governed by the controlled speed of the engine and with intermediate speeds of indeterminate and practically infinite number actuated automatically as required in the performance of the car under the effective load as determined by the weight carried, incline of road and other factors, the apparatus being self-controlled and in balance with the work to be performed to obviate manual change of the speed ratios of engine and propeller-shaft.

A still further object of our invention is the provision of reversing devices included in the same apparatus and actuated in substantially the same manner as the forward drive thereof.

Other objects and advantages, and objects relating to means of operation and control together with accessory parts will be fully set forth in the detailed description to follow.

The accompanying drawings illustrate by way of example an embodiment of our invention in its selected form, in which.

Referring to said views, the reference numeral 1 indicates the lower half-section of the external housing of our improved variable speed transmission apparatus and 2 the upper half-section thereof. Said lower section may be formed with laterally directed lugs 3 through which it may be rigidly secured to the frame of the automobile chassis. Said housing is formed in bi-lateral symmetry and its longitudinal axis is in line with the similar axis of the car. Said housing is formed with bearing-apertures 6 at each end, one-half of each said aperture 6 being formed in each said section and bearing-brasses 10 are seated therein, the sections also being rigidly clamped together upon each side of said bearings through bolt-holes 11.

Internally of said housing the lower section 1 is formed with projecting lugs 12 at each side projecting inwardly in substantially the plane of its marginal flange 13. Annular bearing-straps 15 and 16 are provided with lugs 17 and rigidly connected to said lugs 12. The forward strap 15 is formed with an inturned marginal flange 18 and the strap 16 is formed with an annular ledge 20.

A cylinder 21 is rotatably mounted in said bearing-straps 15 and 16. The rear relatively perpendicular face of said cylinder bears upon a ball thrust-bearing 22 which in turn engages said annular ledge 20. The forward relatively perpendicular face 23 of the cylinder is confined by said flange 18, a ball thrust-bearing 24 being positioned therebetween.

A clutch of the roller type is formed in the perimeter of said cylinder acting against the inner face of said strap 15 and consists in a plurality of spaced re-entrant angular notches 25 about the forward periphery of the cylinder and having in each said notch a roller 26. Said notches are arranged and disposed so that the cylinder may rotate freely in the same rotary direction as the motor crank-shaft 8 but will be firmly locked against rotation by said clutch in the contrary direction.

To the rear of said cylinder 21 an externally cylindrical casing 27 of about the same diameter as said cylinder is rigidly or integrally connected at its forward end to said strap-bearing 16.

Said cylinder 21 is formed internally with an axially disposed conical chamber 28 having its larger end directed toward the rear and its smaller, front end extending in a cylindrical bore 30 and in a reduced bore 31 through the forward face 23 of the cylinder. The casing 27 is similarly formed with a tapered chamber 32 disposed oppositely to said chamber 28 of the cylinder thus having its larger end facing forwardly in axial alignment with the larger end of chamber 28. Said chambers are of substantially the same dimensions and with the same inclinations of their diverging walls 33 and 34, respectively.

The casing 27 is further formed with a bore 35 at the rear of its chamber 32 extending through the rear wall of the casing.

Figure 7:
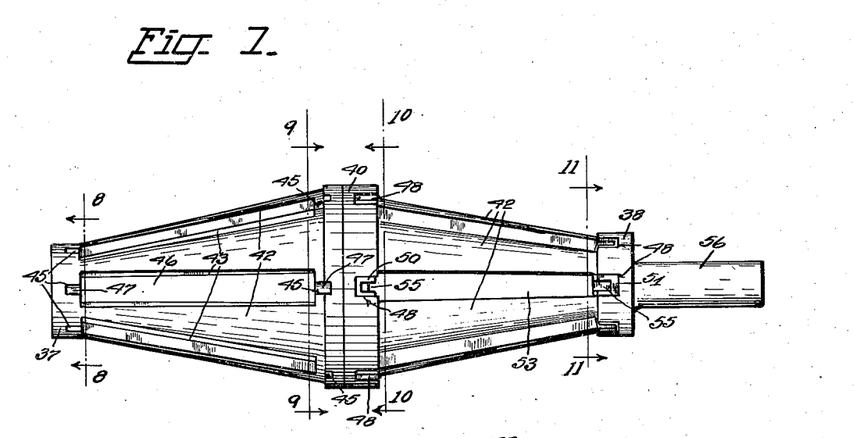
Fig. 7 is a detached view in side elevation of the driving-frame element of the invention.
Figure 8:
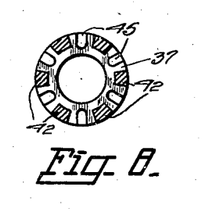
Fig. 8 is a view in cross section on line 8—8 of Fig. 7.
Figure 9:
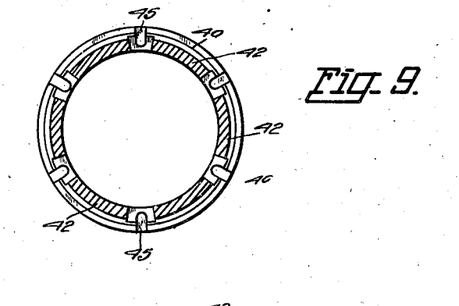
Fig. 9 is a view in cross section on line 9—9 of Fig. 7.
Figure 10:
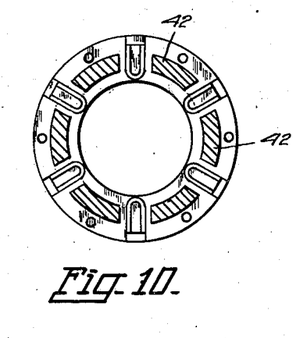
Fig. 10 is a view in cross section on line 10—10 of Fig. 7.
Figure 11:
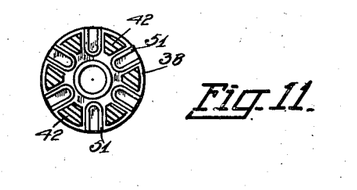
Fig. 11 is a view in cross section on line 11—11 of Fig. 7.

A rotatable frame 36 is mounted in said chambers 28 and 32, see Fig. 7, consisting in circular disks 37 and 38 respectively positioned in the smaller opposite ends of said chambers to rotate therein, and a medial ring 40 of larger diameter rotatably supported in the bearing-strap 16 or recessed end of the casing 27. Said ring may be formed of discrete parts, as shown, rigidly connected together by pins 41.

Said rings and disks are rigidly connected together by tapered bars 42 disposed in regular spaced relation to provide roller-spaces 43 therebetween. Between said bars upon the forward side of the ring and in the opposing face of the forward said disk, 37, recesses 45 are formed from their outer circumferences and inner marginal edges to provide aligned seats for a plurality of cylindrical steel rollers 46 formed or provided with trunnions 47 at their opposite ends to be rotatably supported in said recesses.

At the rear of said ring between said bars 42 deeper recesses 48 are formed in each of which a slotted block 50 is seated. Said rear disk 38 is similarly recessed to receive slotted blocks 51 between said bars. Tapered rollers 52 and 53 formed with trunnions 55 are rotatably mounted in superimposed radial relation in said slotted blocks 50 and 51. Said rollers 52 and 53 are disposed with their smaller ends directed rearwardly and roll upon each other at their meeting line while the circumference of the outer roller 53 may lie parallel with the interior wall 34 of the casing through the free support of the trunnions 55 in the slotted blocks.

Said disk 38 is formed with a rearwardly extending shank 56 between which and the casing 27 a ball-bearing 57 is provided. Said shank extends through the rear said bearing-aperture 6 to the exterior of the housing where it may be keyed to a member 58 of a universal-joint 59 in the propeller-shaft 7.

A double-cone driving member 60 in said chambers 28 and 32 is provided at its forward end with an integral shank 64 extending through an aperture in said disk 37 and is journaled in the forward bearing 6 of the housing. Forwardly of its journal support said shank is operatively connected to the motor shaft 8 through a slotted and keyed connection, as at 61, admitting of limited sliding movements of the cone driving member in longitudinal directions.

Figure 1:
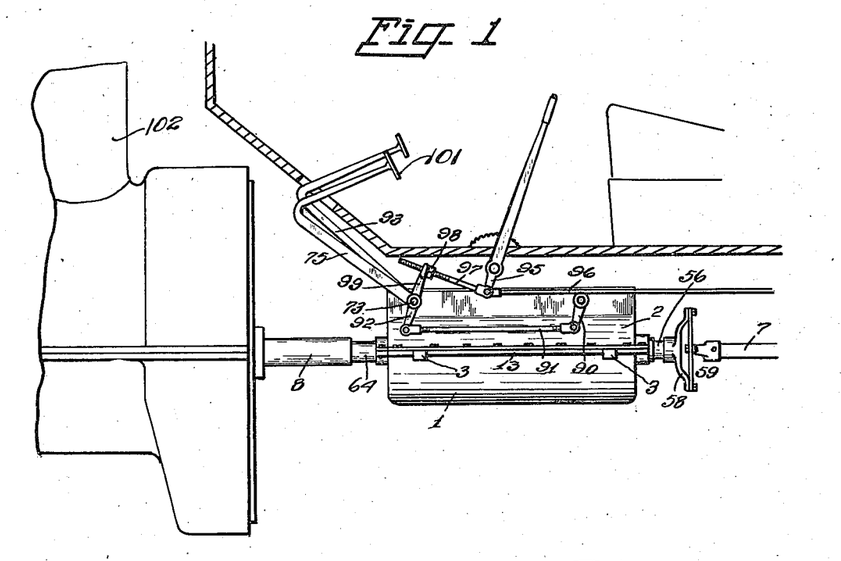
Figure 1 is a view in side elevation of apparatus embodying our invention, shown mounted as in an automobile which is partially indicated.
Figure 2:
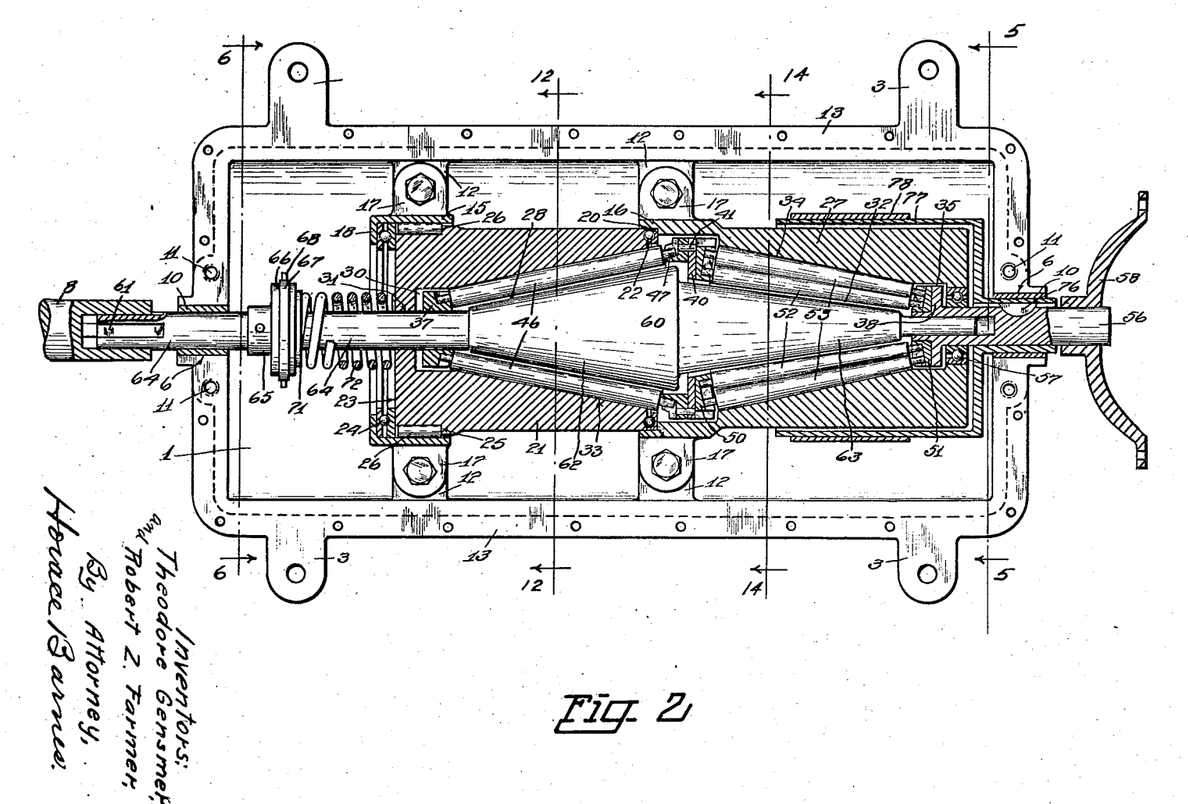
Fig. 2 is a view in top plan of the under section of the housing of our apparatus with the operative parts shown partly in plan and partly in horizontal cross-section and in their neutral position.

The forward cone portion 62 of said member 60 is formed with its exterior face inclined at the same angle as the wall 33 of the chamber 28. The rear cone portion 63 of said member may be of reduced diametrical dimensions from the cone portion 62 and having its superficies inclined in parallel with the inclination of the inner tapered rollers 52. Said cone-member 60 is shiftable in the chambers 28 and 32 to operatively engage the respective cones 62 or 63 with either the rollers 46 or 52 or to an intermediate position as shown in Fig. 2, where it is disengaged from all rollers in so-called neutral position.

A collar 65 is keyed to said shank 64 adjacent the forward end of the housing and is formed with an annular groove 66 to receive a ring 67 provided with oppositely projecting pins 68 extending in horizontal directions and to which a yoke-lever 70 is connected. A loose ring 71 is mounted on said shank bearing upon the collar 65. Confined between said ring and the front face 23 of the cylinder is a coil-spring 72 about said shank adapted to exert a forward thrust upon the collar 65 and tend to yieldingly retain the cone-member 60 in its foremost position.

Figure 6:
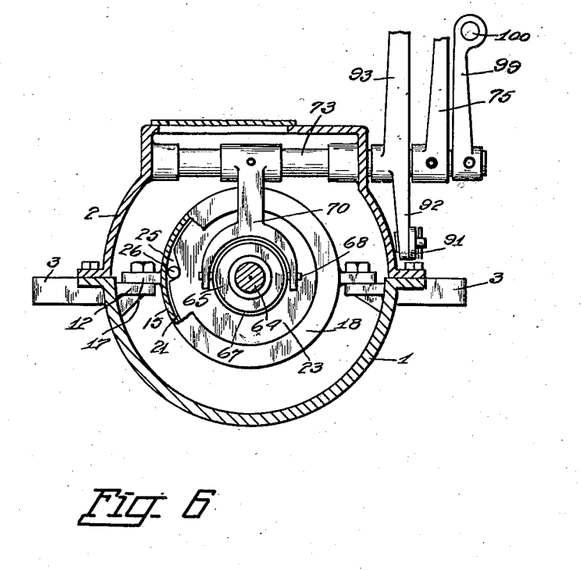
Fig. 6 is a view in complete vertical cross section as on line 6—6 of Fig. 2.

The yoke-lever 70 is pinned to a rocking-arbor 73 journaled in the upper portion of the housing, see Fig. 6, and extends outwardly of the housing where an operating foot-controlled lever 75 is rigidly connected therewith.

Secured to said rear shank 56 by key 76 to rotate therewith is a brake-drum 77 extending exteriorly and spaced from the casing 27. A brake-band 78 extends about said drum and is provided with slotted lugs 80. A pin 81 is received within the lug-slots and is supported for oscillation in a boss 83 integral or rigidly mounted in said upper section 2 of the housing and having a horizontally disposed bore therethrough. Said pin is screw-threaded on its inner end to receive nuts 84 engaging upon the outer side of one of said lugs 80 while the other lug bears against the boss 83. A coil-spring 85 upon said pin between the lugs yieldingly presses the lugs against the boss and nuts to resiliently maintain the brake-band in open inoperative position.

A boss 86 upon the outer side of the housing is in line with boss 83 and bored in register therewith through which the pin 81 extends. Said boss 86 is formed with an inclined face 87 against which the inclined face 88 of a crank-arm 90 keyed to the pin 81 is opposed. A link 91 connects said crank-arm 90 with a crank-arm 92 loosely mounted on the rocking-arbor 73. A foot-controlled brake-lever 93 is integrally connected with the crank-arm 92.

The emergency brake-lever 95 is connected by link-rod 96 with the emergency brake, not shown, associated with the rear driving wheels. A rod 97 is pivotally connected to the lower end of the brake-lever 95 and is screw-threaded at its opposite end to receive an adjustment nut 98. An arm 99 is pinned to said rocking-arbor 73 and is formed at its opposite end with an aperture 100 through which said rod 96 extends with a relatively close sliding fit. Said nut is adjusted upon the rod 97 so that when the emergency brake-lever 95 is thrown into action the arm 99 will be engaged to oscillate the rocking-arbor and thereby throw the driving-member 60 into neutral position.

Figure 3:
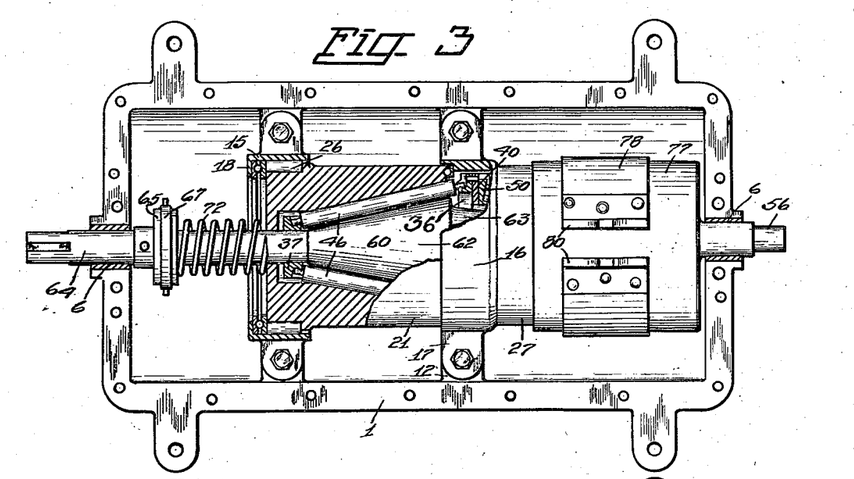
Fig. 3 is a view similar to Fig. 2 illustrating the operative parts in their advance positions and with the rear portions shown in plan.

The operation of our invention may be described as follows: Referring to Fig. 3 wherein the apparatus is illustrated in its forward propelling position, it will be seen that the spring 72 between the collar 65 upon the shank 64 and the cylinder 21 urges the double-cone member 60 forwardly to bring the forward cone 62 into pressed operative contact with the rollers 46. This action is accomplished by the release of the foot-lever 75 from any latch-means provided and which causes the pedal-extremity 101 of said foot-lever to move rearwardly under the tension of said spring as the cone-member 60 extends forwardly.

The car motor 102 being in motion, the cone 62 is thrust forwardly into pressed contact with the rollers 46 thus pressing them against the wall 33 of the cylinder 21 as they are free to move outwardly in the recesses in which they are supported. Due to the cone conformation of the opposing surfaces of the cone and said wall 33 with the cylindrical rollers pressed therebetween upon the motion of the cone-member a considerable torque force is set up in the frame 36 carrying the rollers impelling it in the same rotary direction as the cone and which is communicated to the propeller-shaft 7.

Figure 13:
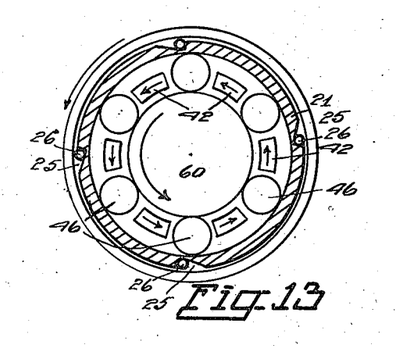

Under relatively light loads and at high speeds the cone-member 60, the cylinder 21 and the frame 36 will all move in unison at the same rate of rotation and in the same direction while the rollers 46 will move with the frame without independent rotary movement. This is the so-called high speed in the apparatus and is practically a direct drive to the rear axle. The frame 36 travels at the same speed as the cone-member 60 which is directly connected with the engine crank-shaft, while the frame is connected to the propeller-shaft. This high speed condition is illustrated diagrammatically in Fig. 13.

As a heavier load is thrown upon the transmission, such as in travelling upon an upgrade or relatively by throttling down the engine to deliver less power from the motor the cylinder 21 will tend to lag to greater or less degree behind the speed of the cone. This condition will cause the rollers 46 to rotate more or less according to the difference in the rate of rotation of the cone and cylinder and thereby reducing the speed of the frame 36 to a mean between the speeds of the cone and the cylinder affording thereby a reduction in speed to the driving wheels and a proportionate increase in power.

Such relative action of the cone and cylinder provides the intermediate drives of the car. Such intermediate changes of speed are theoretically infinite between the described high speed or direct drive and the extreme low speed to be presently described. The lagging action of the cylinder is determined by the load or driving power required and operates automatically, fluctuating in both direction of increase or reduction of speed to give more or less power with corresponding reduction or increase in power applied to the drive wheels.

Figure 12:
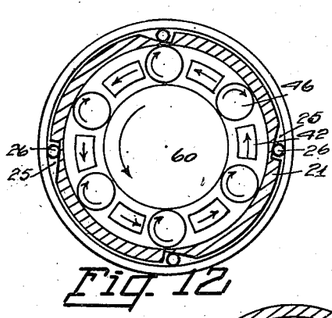
Figs. 12, 13 and 14 are diagrammatical views illustrating the operation of the invention.

When the thrust of the rollers 46 in their rotation is sufficiently great upon the cylinder to cause it to reverse as it will do under heavy demands, such as in climbing a steep hill, the clutch-rollers 26 in the notches 25 will assert themselves to lock the cylinder to the bearing-strap 15 and immediately prevent such reverse rotation thereby affording a fixed bearing for rollers 46 and increasing the leverage provided so that the maximum power may be communicated to the driving wheels, as the rate of rotation of the frame 36 to that of the driving cone is practically proportionate to the diameter of the rollers and the mean diameter of the cone, see diagrammatic view, Fig. 12.

Immediately the heavy duty is removed from the apparatus, as in the car reaching a more level roadway, the cylinder will immediately begin to move with the frame and thereby releasing the clutch-rollers and increasing the driving speed. This entire series of change speeds is completely automatic and will operate continuously without thought or control on the part of the driver, changing towards high speeds as level or downhill stretches are encountered and shifting through the intermediate speeds into extreme low, if necessary, that will deliver the maximum of power of the engine as the steeper hills are met.

The driver may operate his car with ease with only the gas-throttle to control the stream of power delivered to the apparatus and all variations in the application of the power to the driving wheels is performed instantly and inerrantly as the requirements upon the proper performance of the car varies.

By referring to Fig. 2 the apparatus may be seen in neutral position wherein the cone-driving member 60 is unengaged at both its ends and consequently the engine crank-shaft is cut off from the propeller-shaft. To accomplish this the driver presses the foot-lever 75 forwardly about halfway of its travel whereat it may be releasably held by latch-devices, not shown. This action causes the cone-member 60 to shift rearwardly partially compressing the spring 72 and maintains the cone out of engagement with the frame-rollers and disconnects the engine from the driving wheels.

Figure 4:
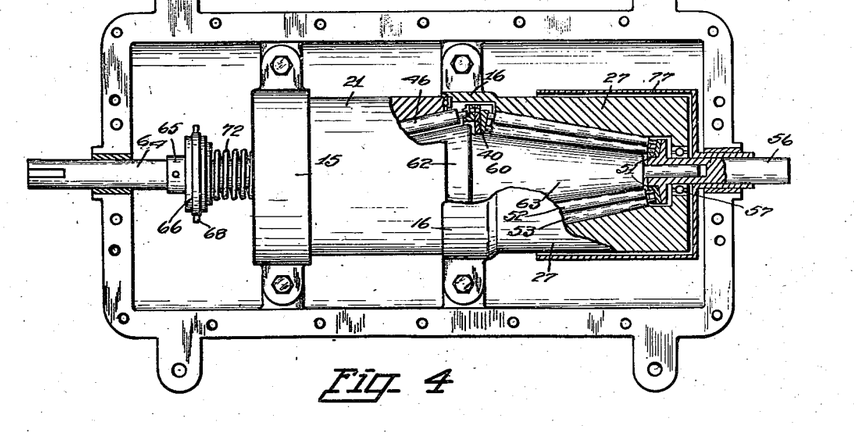
Fig. 4 is a view similar to Fig. 3 with the parts in reverse position and with the forward parts shown in plan.
Figure 5:
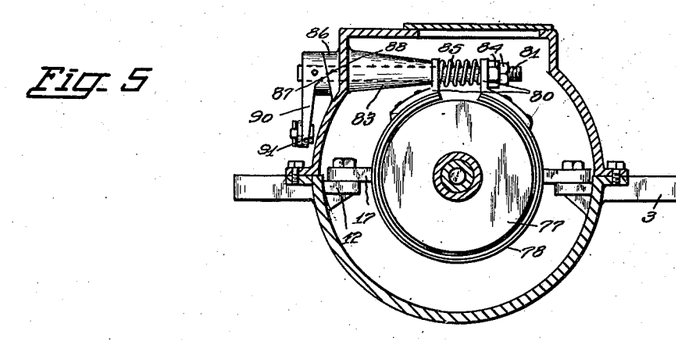
Fig. 5 is a view in complete vertical cross section as on line 5—5 of Fig. 2.
Figure 14:
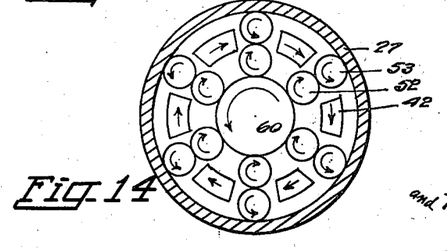

To place the car in reverse the foot-pedal is pressed fully forward to cause the cone-member to shift into its rearmost position, see Fig. 4, where the cone 63 engages the tapered rollers 52 to revolubly actuate them in the opposite rotary direction and which in turn cause the outer rollers 53 to rotate in similar directions to the cone while the frame 36 will be caused to rotate oppositely to the cone giving a reverse direction of revolution to the propeller-shaft, as illustrated in Fig. 14. The casing 27 is held stationary at all times making the reverse drive of the car the equivalent of the low-speed of the forward drive heretofore described.

One of the advantageous features of the invention resides in the action of the apparatus in locking the wheels of the car when the cone-member is in engagement in either advance or reverse from movements in a contrary direction. Thus when the cone 62 is in engagement with the rollers 46 the car will be locked from reverse movements as power from the drive-wheels through the frame cannot drive the cone-member and the corresponding condition is true when the cone 63 is in engagement with the reversing rollers 52 and 53.

In the actual performance of a car employing our apparatus the tendency thereof is at all times to work into high speeds. On level roads and under usual conditions the car will ride in high at engine speed as controlled by the gas-throttle. As soon as an upward incline is reached ordinarily requiring under present practice a shift into intermediate gear the heavier duty on the drive wheels will retard the frame 36 with a slowing down of the cylinder 21 due to the relatively reverse rotation of the rollers 46 and an equivalent increase in power through the frame to the drive wheels.

Such action will automatically adjust itself to the exact amount of change required to transport the load at the rate of speed determined by the energy delivered by the engine, so that no power is lost nor is the power to the drive wheels cut off at any time in the changes made as is the case with geared transmissions.

As the road becomes more level the speed will pick up and as it becomes steeper the speed will be cut down and the power increased until the extreme low point where the cylinder 21 is locked so that the maximum power of the car may be exerted.

Immediately the power required becomes less the speed will increase through the cylinder taking up the motion of the frame until at its maximum the cylinder, frame, and cone-member are in unitary rotation together with the rollers 46 at a standstill.

Having described our invention, what we claim as our invention, is:—

1. Variable speed transmission apparatus, consisting in a housing, annular bearing straps rigidly mounted in spaced relation interiorly of said housing, a cylinder rotatably journaled in said bearing-straps having an interior, axially conical chamber, a fixed casing mounted in axial alignment with said cylinder formed with an interior, axially conical chamber oppositely disposed to said cylinder-chamber, a clutch device to prevent reverse rotation of said cylinder, a rotatable frame mounted in said chambers and operatively connected with a driven shaft, a plurality of cylindrical rollers rotatably supported in said frame in parallel with the inclined wall of said cylinder-chamber, a plurality of pairs of tapered rollers rotatively supported in said frame within said casing-chamber, said pairs of rollers being arranged in radial, superposed relation, a driving-member journaled in said housing and slidably connected to a power-driven shaft and including a pair of cones in integral opposed relation disposed in said chambers, respectively, and slidable to selectively engage either of said sets of rollers, means to resiliently engage said driving-member with said cylindrical rollers, and means to shift said driving-member to engage said tapered rollers.

2. Variable speed transmission apparatus, consisting in a housing, annular bearing-straps rigidly mounted in spaced relation interiorly of said housing, a cylinder rotatably journaled in said bearing-straps having an interior, axially conical chamber, a fixed casing mounted in axial alignment with said cylinder formed with an interior, axially conical chamber oppositely disposed to said cylinder-chamber, a clutch device to prevent reverse rotation of said cylinder, a rotatable frame mounted in said chambers and operatively connected with a driven shaft, a plurality of rollers rotatably supported in said frame in engagement with the inclined wall of said cylinder-chamber, a plurality of pairs of rollers rotatively supported in said frame within said casing-chamber, said pairs of rollers being arranged in radial, superposed relation, a driving-member journaled in said housing and slidably connected to a power-driven shaft and including a pair of cones in integral opposed relation disposed in said chambers, respectively, and slidable to selectively engage either of said sets of rollers, means to resiliently engage said driving-member with the rollers within said cylinder, and means to shift said driving-member to engage said rollers within the casing.

3. Variable speed transmission apparatus, consisting in a housing, a cylinder rotatably journaled in said housing having a conical chamber therein, a fixed casing mounted in axial alignment with said cylinder formed with a conical chamber oppositely disposed to said cylinder-chamber, means to prevent reverse rotation of said cylinder, a rotatable frame mounted in said chambers and operatively connected with a driven shaft, a plurality of cylindrical rollers rotatably supported in said frame in parallel with the inclined wall of said cylinder-chamber, a plurality of pairs of tapered rollers rotatively supported in said frame within said casing-chamber, said pairs of rollers being arranged in radial, superposed relation, a driving-member journaled in said housing and slidably connected to a power-driven shaft and including a pair of cones in integral opposed relation disposed in said chambers, respectively, and slidable to selectively engage either of said sets of rollers, resilient means to engage said driving-member with said cylindrical rollers, and means to shift said driving-member to engage said tapered rollers.

4. Variable speed transmission apparatus, consisting in a housing, a cylinder rotatably journaled in said housing having a conical chamber therein, a fixed casing mounted in axial alignment with said cylinder formed with a conical chamber oppositely disposed to said cylinder-chamber, means to prevent reverse rotation of said cylinder, a rotatable frame mounted in said chambers and operatively connected with a driven shaft, a plurality of rollers rotatably supported in said frame in engagement with the inclined wall of said cylinder-chamber, a plurality of pairs of rollers rotatively supported in said frame within said casing-chamber, said pairs of rollers being arranged in radial, superposed relation, a driving-member journaled in said housing and slidably connected to a power-driven shaft and including a pair of cones in integral opposed relation disposed in said chambers, respectively, and slidable to selectively engage either of said sets of rollers, resilient means to engage said driving-member with the rollers within said cylinder, and means to shift said driving-member to engage said rollers within the casing.

5. Variable speed transmission apparatus, consisting in a housing, a cylinder rotatably journaled in said housing having a conical chamber therein, a casing mounted in axial alignment with said cylinder formed with a conical chamber oppositely disposed to said cylinder-chamber, a clutch device to prevent reverse rotation of said cylinder, a rotatable frame mounted in said chambers and operatively connected with a driven shaft, a plurality of rollers rotatably supported in said frame in engagement with the inclined wall of said cylinder-chamber, a plurality of rollers rotatively supported in said frame within said casing-chamber, and a driving-member journaled in said housing and slidably connected to a power-driven shaft and including a pair of cones in integral opposed relation disposed in said chambers, respectively, and slidable to selectively engage either of said sets of rollers.

6. Variable speed transmission apparatus, consisting in a housing, a cylinder rotatably journaled in said housing having a chamber therein, a casing mounted in axial alignment with said cylinder and formed with a chamber disposed in axial alignment with said cylinder-chamber, means to prevent reverse rotation of said cylinder, a rotatable frame mounted in said chambers and operatively connected with a driven shaft, a plurality of rollers rotatably supported in said frame in engagement with the wall of said cylinder-chamber, a plurality of rollers rotatively supported in said frame within said casing-chamber, a driving-member connected to a power-driven shaft and arranged to selectively engage either of said sets of rollers, resilient means to engage said driving-member with the rollers within said cylinder, and means to shift said driving-member to engage the rollers within the casing.

7. Variable speed transmission apparatus, consisting in a housing, a cylinder rotatably journaled in said housing having a chamber therein, a casing mounted in axial alignment with said cylinder and formed with a chamber disposed in axial alignment with said cylinder-chamber, means to prevent reverse rotation of said cylinder, a rotatable frame mounted in said chambers and operatively connected with a driven shaft, a plurality of rollers rotatably supported in said frame in engagement with the wall of said cylinder-chamber, a plurality of rollers rotatively supported in said frame within said casing-chamber, and a driving-member connected to a power-driven shaft and arranged to selectively engage either of said sets of rollers.

8. Variable speed transmission apparatus, consisting in a housing, a cylinder rotatably journaled in said housing having a conical chamber therein, means to prevent reverse rotation of said cylinder, a frame rotatable in said chamber and operatively connected with a driven shaft, a plurality of rollers rotatably supported in said frame in engagement with the inclined wall of said cylinder-chamber, a driving-member journaled in said housing and slidably connected to a power-driven shaft and including a cone disposed in said chamber, resilient means to slidably engage said driving-member with said rollers, and means to shift said driving-member to disengage said rollers.

9. Variable speed transmission apparatus, consisting in a housing, a cylinder rotatably journaled in said housing having a conical chamber therein, means to prevent reverse rotation of said cylinder, a frame rotatable in said chamber and operatively connected with a driven shaft, a plurality of rollers rotatably supported in said frame in engagement with the inclined wall of said cylinder-chamber, and a driving member journaled in said housing and slidably connected to a power-driven shaft and including a cone disposed in said chamber.

10. Variable speed transmission apparatus, consisting in a housing, a cylinder rotatably journaled in said housing having an axially arranged interior chamber, means to prevent the reverse rotation of said cylinder, a frame rotatable in said chamber and operatively connected with a driven shaft, a plurality of rollers rotatably supported in said frame in engagement with the wall of said chamber, and a driving-member journaled in said housing and slidably connected to a power-driven shaft.

11. Variable speed transmission apparatus, consisting in a rotatably mounted cylinder having an interior circular chamber, means to prevent the reverse rotation of said cylinder, a power-driven member rotatably mounted axially of said chamber, a frame rotatable between said cylinder and said member, and a plurality of rollers mounted in said frame and operatively engageable with the wall of said chamber and said member.

12. Variable speed transmission apparatus, consisting in a rotatably mounted cylinder having an interior conical chamber, a power-driven member rotatably mounted axially of said chamber including a cone, a conical frame rotatable between said cylinder and said cone, and a plurality of cylindrical rollers rotatively mounted in said frame and operatively engageable with the wall of said chamber and said cone.

13. Variable speed transmission apparatus, consisting in a rotatably mounted cylinder having an axially conical chamber, means to prevent reverse rotation of said cylinder, a power-driven member rotatably mounted axially of said chamber including a cone-shaped portion, a conical frame rotatable between said cylinder and said cone-portion of said member, and a plurality of cylindrical rollers rotatively mounted in said frame and operatively engageable with the wall of said chamber and said cone-portion.

14. Variable speed transmission apparatus, consisting in a rotatably mounted cylinder having an axially conical chamber, means to prevent reverse rotation of said cylinder, a power-driven member rotatably mounted axially of said chamber including a cone-shaped portion, a conical frame rotatable between said cylinder and said cone-portion, a plurality of cylindrical rollers rotatively mounted in said frame and operatively engageable with the wall of said chamber and said cone-portion, means to resiliently engage said cone-portion with said rollers, and means to retain said cone-portion out of engagement with said rollers.

15. In variable speed transmission apparatus, a rotatably driven element, a plurality of rollers rotatably mounted in said element, a driving member disposed interiorly of said driven element having its exterior driving surface in parallel with said rollers, and a resistance member rotatable exteriorly of said driven element having an interior conical wall in parallel with the surface of said driving member.

16. In variable speed transmission apparatus, a rotatably driven element, a plurality of rollers rotatably mounted in said element, a driving member disposed interiorly of said driven element having its exterior driving surface in parallel with said rollers, a resistance member rotatable exteriorly of said driven element having an interior conical wall in parallel with the surface of said driving member, and means to prevent the reverse rotation of said resistance member.

17. In variable speed transmission apparatus, a centrally disposed driving cone, a rotatable frame mounted exteriorly of said cone including a plurality of cylindrical rollers, and a resistance member exteriorly of said frame having an interior conical wall in parallel with said cone.

18. In variable speed transmission apparatus, an axially disposed cone-shaped driving member, an exterior resistance member having a conical chamber to receive said member, a driven element interposed between said members, and a plurality of cylindrical rollers engageable with both of said members.

19. In variable speed transmission apparatus, an axially disposed cone-shaped driving member, a rotatable exterior resistance member having a conical chamber in parallel with said driving member, a driven element interposed between said members, and a plurality of cylindrical rollers mounted in said element engageable with both said members.

THEODORE GENSMER.
ROBERT Z. FARMER.